United States Patent
Takeda (10) Patent No.: US 11,280,648 B2
(45) Date of Patent: Mar. 22, 2022

(54) ULTRASONIC FLOW-RATE MEASUREMENT DEVICE AND ULTRASONIC FLOW-RATE MEASUREMENT METHOD

(71) Applicant: Flowbiz Research INC., Tokyo (JP)

(72) Inventor: Yasushi Takeda, Sendai (JP)

(73) Assignee: FLOWBIZ RESEARCH INC., Tokyo (JP)

( * ) Notice: Subject to any disclaimer, the term of this patent is extended or adjusted under 35 U.S.C. 154(b) by 20 days.

(21) Appl. No.: 16/763,898

(22) PCT Filed: Nov. 14, 2017

(86) PCT No.: PCT/JP2017/040918
§ 371 (c)(1),
(2) Date: May 13, 2020

(87) PCT Pub. No.: WO2019/097570
PCT Pub. Date: May 23, 2019

(65) Prior Publication Data
US 2021/0172776 A1 Jun. 10, 2021

(51) Int. Cl.
*G01F 1/66* (2006.01)
*G01F 1/663* (2022.01)

(52) U.S. Cl.
CPC .................... *G01F 1/663* (2013.01)

(58) Field of Classification Search
CPC ...................................... G01F 1/663
(Continued)

(56) References Cited

U.S. PATENT DOCUMENTS

2019/0285454 A1* 9/2019 Koyama ............. G01F 15/0755

FOREIGN PATENT DOCUMENTS

| JP | S59-161035 U | 10/1984 |
| JP | 2003-254987 A | 9/2003 |

(Continued)

OTHER PUBLICATIONS

Translation of JP-2017075834-A (provided by Applicant) (Year: 2017).*

(Continued)

*Primary Examiner* — Nathaniel T Woodward
(74) *Attorney, Agent, or Firm* — Rabin & Berdo, P.C.

(57) ABSTRACT

An ultrasonic flow-rate measurement device and an ultrasonic flow-rate measurement method capable of accurately measuring a flow rate of a fluid to be measured with a simple configuration are obtained. A reference-sound-pressure distribution waveform holding unit (60) holds a reference sound pressure distribution waveform based on an ultrasonic pulse emitted from a transmitter (10) and incident on at least three receivers (20) in a state where a flow velocity of a fluid (G) to be measured in the pipe (5) is zero. A variable-sound-pressure distribution waveform acquisition unit (70) acquires a variable sound pressure distribution waveform based on the ultrasonic pulse emitted from the transmitter (10) and incident on the at least three receivers (20) in a state where the flow velocity of the fluid (G) to be measured in the pipe (5) is not zero. A flow-rate calculation unit (80) obtains a shift amount (S), which is a difference between the reference sound pressure distribution waveform and the variable sound pressure distribution waveform, and integrates the shift amount (S), thereby calculating a flow rate of the fluid (G) to be measured in the pipe (5).

3 Claims, 9 Drawing Sheets

(58) Field of Classification Search
USPC .......................................................... 73/861.18
See application file for complete search history.

(56) References Cited

FOREIGN PATENT DOCUMENTS

| JP | 2003254987 A | * | 9/2003 |
| JP | 2017-075834 A | | 4/2017 |
| JP | 2017075834 A | * | 4/2017 |
| WO | 2005/031368 A2 | | 4/2005 |
| WO | 2008/004560 A1 | | 1/2008 |

OTHER PUBLICATIONS

Translation of JP-2003254987-A (provided by Applicant) (Year: 2003).*

* cited by examiner

ULTRASONIC FLOW-RATE MEASUREMENT DEVICE AND ULTRASONIC FLOW-RATE MEASUREMENT METHOD

TECHNICAL FIELD

The present invention relates to an ultrasonic flow-rate measurement device and an ultrasonic flow-rate measurement method.

BACKGROUND ART

In the related art, a general ultrasonic flowmeter makes an ultrasonic pulse incident in a flow direction of a fluid in a pipe to obtain an average flow velocity using the fact that the ultrasonic pulse flies in the pipe at a velocity that is the sum of the velocity of sound and a flow velocity, and obtains an average flow rate by multiplying the average flow velocity by a cross-sectional area of the pipe. However, the ultrasonic flowmeter only obtains the average flow velocity and the average flow rate in the flow direction, and does not consider a flow state (flow velocity distribution in a direction orthogonal to the flow direction). For this reason, the flow velocity distribution in the pipe is assumed to have an ideal flow field (as a premise), a measurement environment should be prepared based on such an assumption, and various setting conditions (constraints) are imposed. Further, it is necessary to use a so-called profile factor for correcting a deviation of the flow velocity distribution, and it is difficult to guarantee accuracy from the viewpoint of calibration and the like. Furthermore, since measurement is very difficult with a small-diameter pipe and the flow field is assumed to be axially symmetric, stability and reliability of the measured values can hardly be guaranteed in the wake of a curved pipe or the like.

On the other hand, Patent Literature 1 discloses a flow velocity distribution measurement device that measures a flow velocity distribution of a gas fluid flowing in a fluid pipe using an ultrasonic pulse. In the flow velocity distribution measurement device, an ultrasonic pulse is emitted from a transmitting transducer installed on a pipe wall of a fluid pipe to a fluid to be measured flowing in the fluid pipe, and the ultrasonic pulse is detected by a plurality of receiving transducers installed two-dimensionally on a facing pipe wall in the fluid pipe. The displacement amount of the ultrasonic pulse in an axial direction of the pipe is detected from signals detected by the plurality of receiving transducers arranged in the axial direction of the pipe. More specifically, two measurement lines having opening angles slightly different from each other are set, and a flow velocity at a predetermined position is obtained from a difference in displacement amounts and in flying times that are respectively detected for the measurement lines.

CITATION LIST

Patent Literature

Patent Literature 1: International Publication No. WO 2008/004560

SUMMARY OF INVENTION

Technical Problem

However, Patent Literature 1 has a configuration in which, after the plurality of receiving transducers detect the ultrasonic pulse, the flow velocity distribution (flow velocity distribution in a cross section orthogonal to the axis of the fluid pipe) in the direction orthogonal to the flow direction is calculated based on the displacement amount of the ultrasonic pulse in the axial direction of the pipe and the flow rate of the gas fluid flowing in the fluid pipe is calculated based on the flow velocity distribution. Therefore, the calculation may become complicated and the capacity may increase, and when a calculation error or a disturbance factor is added in the process of calculating the flow velocity distribution from the displacement amount of the ultrasonic pulse and the process of calculating the flow rate of the gas fluid from the flow velocity distribution, the flow rate of the gas fluid may not be accurately measured.

The present invention has been made based on the above awareness of the problems, and an object thereof is to obtain an ultrasonic flow-rate measurement device and an ultrasonic flow-rate measurement method capable of accurately measuring a flow rate of a fluid to be measured with a simple configuration.

Solution to Problem

An ultrasonic flow-rate measurement device according to the present embodiment includes: a transmitter that is installed in a pipe through which a fluid to be measured flows and emits an ultrasonic pulse; at least three receivers that are installed in the pipe to face the transmitter and on which the ultrasonic pulse is incident; a reference-sound-pressure distribution waveform holding unit that holds a reference sound pressure distribution waveform based on the ultrasonic pulse emitted from the transmitter and incident on the at least three receivers in a state where a flow velocity of the fluid to be measured in the pipe is zero; a variable-sound-pressure distribution waveform acquisition unit that acquires a variable sound pressure distribution waveform based on the ultrasonic pulse emitted from the transmitter and incident on the at least three receivers in a state where the flow velocity of the fluid to be measured in the pipe is not zero; and a flow-rate calculation unit that obtains a shift amount, which is a difference between the reference sound pressure distribution waveform and the variable sound pressure distribution waveform, and integrates the shift amount, thereby calculating a flow rate of the fluid to be measured in the pipe.

The number of the receivers to be installed may be (2n+1) (n is a natural number of 2 or more), and the variable-sound-pressure distribution waveform acquisition unit, for each of all combinations for selecting three receivers from the (2n+1) receivers, may acquire the variable sound pressure distribution waveform based on the ultrasonic pulse emitted from the transmitter and incident on the three receivers in a state where the flow velocity of the fluid to be measured in the pipe is not zero, and average the variable sound pressure distribution waveforms for all the combinations.

The transmitter and the receivers may be installed on an inner surface of the pipe.

An ultrasonic flow-rate measurement method according to the present embodiment is an ultrasonic flow-rate measurement method with an ultrasonic flow-rate measurement device including: a transmitter that is installed in a pipe through which a fluid to be measured flows and emits an ultrasonic pulse; and at least three receivers that are installed in the pipe to face the transmitter and on which the ultrasonic pulse is incident, the ultrasonic flow-rate measurement method including: a reference-sound-pressure distribution waveform holding step of holding a reference sound pressure distribution waveform based on the ultrasonic pulse emitted from the transmitter and incident on the at least three receivers in a state where a flow velocity of the fluid to be measured in the pipe is zero; a variable-sound-pressure distribution waveform acquisition step of acquiring a variable sound pressure distribution waveform based on the ultrasonic pulse emitted from the transmitter and incident on the at least three receivers in a state where the flow velocity of the fluid to be measured in the pipe is not zero; and a flow-rate calculation step of obtaining a shift amount, which is a difference between the reference sound pressure distribution waveform and the variable sound pressure distribution waveform, and integrating the shift amount, thereby calculating a flow rate of the fluid to be measured in the pipe.

Advantageous Effect of Invention

According to the present invention, it is possible to obtain an ultrasonic flow-rate measurement device and an ultrasonic flow-rate measurement method capable of accurately measuring a flow rate of a fluid to be measured with a simple configuration.

DESCRIPTION OF EMBODIMENT

Referring to FIGS. 1 to 9, an ultrasonic flow-rate measurement device 1 of the present embodiment will be described. The ultrasonic flow-rate measurement device 1 is mounted on, for example, a muffler of a vehicle and is used to measure a flow rate of an exhaust gas in the muffler of a vehicle. Further, the ultrasonic flow-rate measurement device 1 may be mounted on a pipeline of a factory and used to measure a flow rate of a gas in the pipeline, or when a liquefied natural gas flows from an LNG (Liquefied Natural Gas) tanker to a station or the like, may be used to measure a flow rate of the liquefied natural gas. Further, the ultrasonic flow-rate measurement device 1 may be mounted on a marine engine and used to measure a flow rate of exhaust in the marine engine. In addition, the ultrasonic flow-rate measurement device 1 is applicable to flow-rate measurement of not only a gaseous body such as a gas but also a liquid. In other words, the ultrasonic flow-rate measurement device 1 is used without limitation of the measurement target (there is a degree of freedom), and can be variously changed on design.

Figure 1:
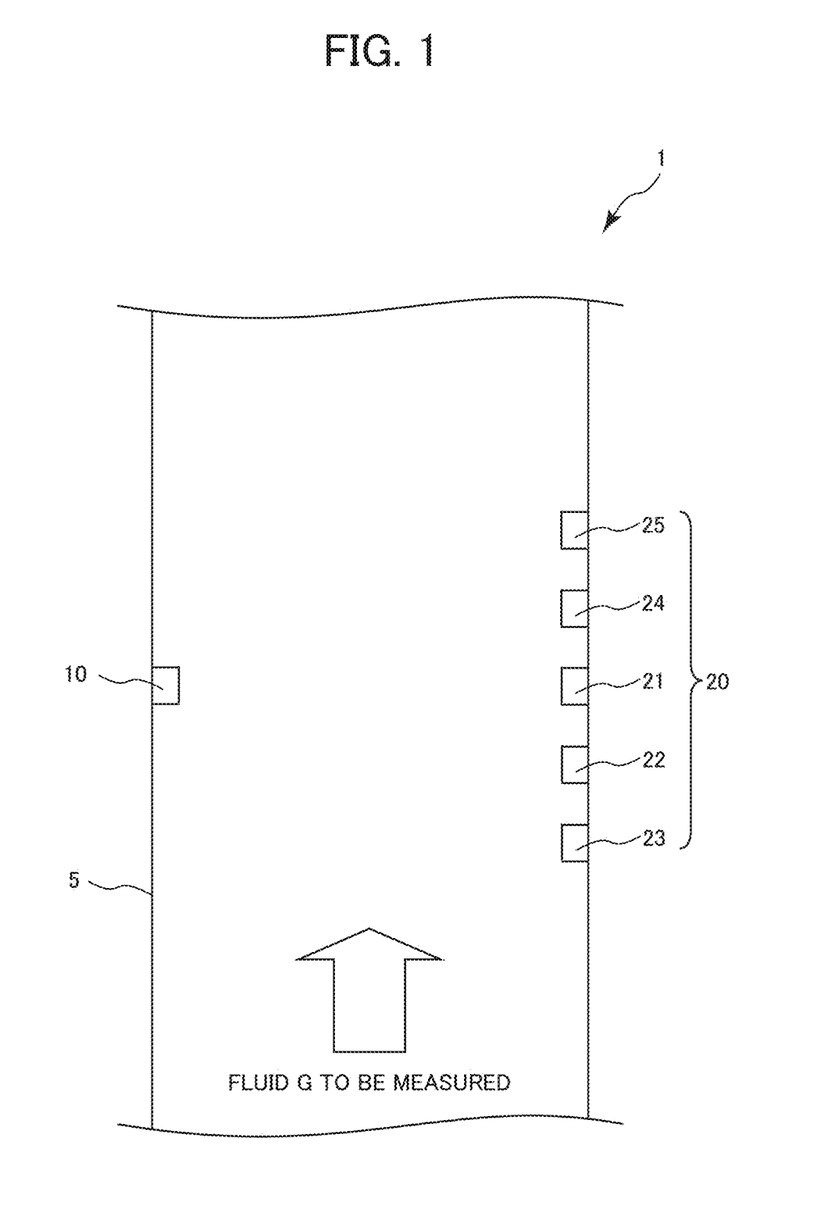
FIG. 1 is a view showing a state in which a transmission-side transducer and a reception-side transducer of an ultrasonic flow-rate measurement device of this embodiment are installed in a pipe.
Figure 2:
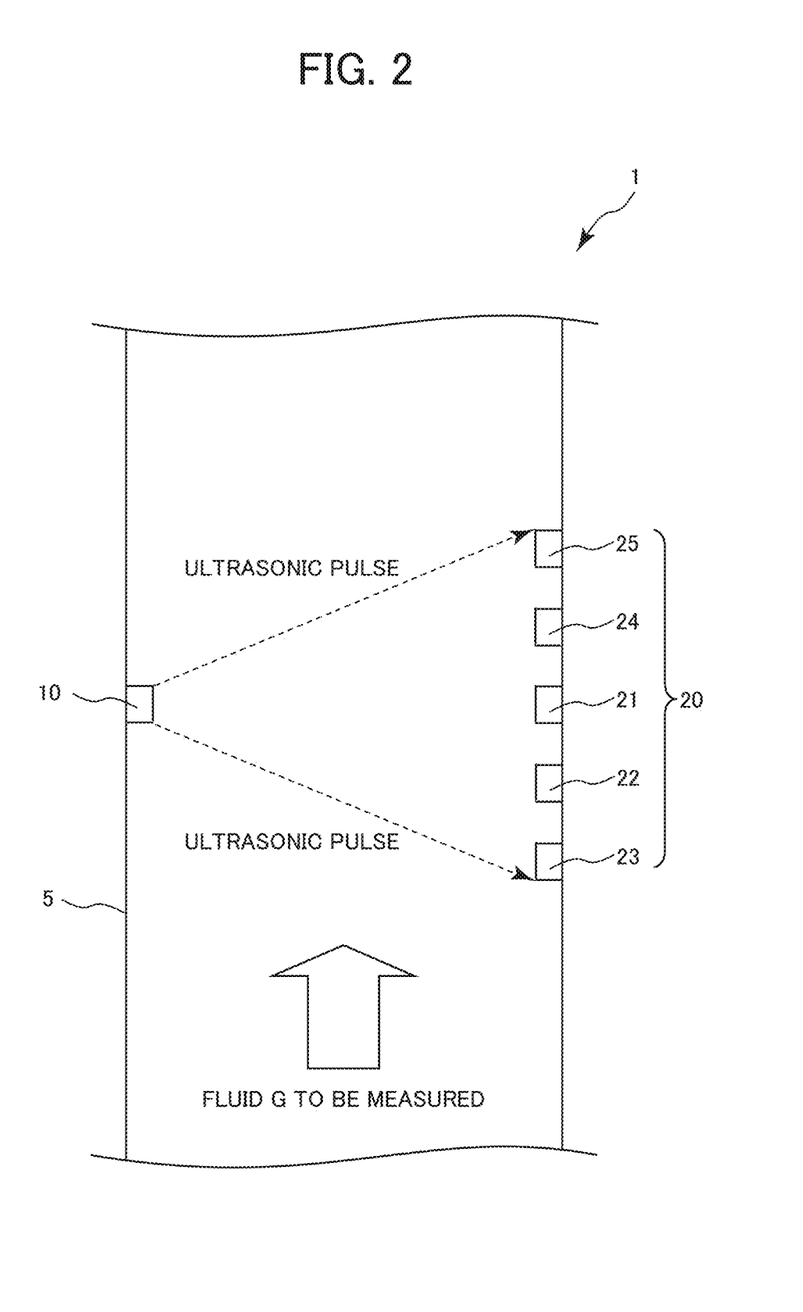
FIG. 2 is a view showing a manner in which an ultrasonic pulse is emitted from the transmission-side transducer in FIG. 1 and the ultrasonic pulse is incident on the reception-side transducer.

As shown in FIGS. 1 and 2, the ultrasonic flow-rate measurement device 1 includes a transmission-side transducer (transmitter) 10 installed on an inner surface of a pipe 5 (for example, a muffler of a vehicle) through which a fluid G to be measured (for example, an exhaust gas) flows. The transmission-side transducer 10 emits an ultrasonic pulse directed to a direction (a right side in the drawings) orthogonal to an axis of the pipe 5 and having a certain degree of divergence angle around the direction orthogonal to the axis of the pipe.

As shown in FIGS. 1 and 2, the ultrasonic flow-rate measurement device 1 includes a reception-side transducer (receiver) 20 installed on the inner surface of the pipe 5 so as to face the transmission-side transducer 10. The reception-side transducer 20 includes a first reception-side transducer 21 facing the transmission-side transducer 10 in the direction (a left-right direction in the drawings) orthogonal to the axis of the pipe, a second reception-side transducer 22 and a third reception-side transducer 23 located upstream of the first reception-side transducer 21, and a fourth reception-side transducer 24 and a fifth reception-side transducer 25 located downstream of the first reception-side transducer 21. The ultrasonic pulse emitted from the transmission-side transducer 10 is incident on the first reception-side transducer 21 to the fifth reception-side transducer 25.

The transmission-side transducer 10 and the first reception-side transducer 21 to the fifth reception-side transducer 25 may be configured by compatible transducers of the same standard. The transducer has both of emission function and incidence function of the ultrasonic pulse.

Here, a case where five transducers of the first reception-side transducer 21 to the fifth reception-side transducer 25 are installed as the reception-side transducer 20 is described as an example, but the number of reception-side transducers 20 can be variously changed on design without being limited thereto. In other words, at least three reception-side transducers 20 may be installed, and preferably, (2n+1) (n is a natural number of two or more) reception-side transducers may be installed. Further, the number of reception-side transducers disposed upstream of the first reception-side transducer 21 may be different from the number of reception-side transducers disposed downstream of the first reception-side transducer 21 (for example, the former may be smaller than the latter).

Figure 3:
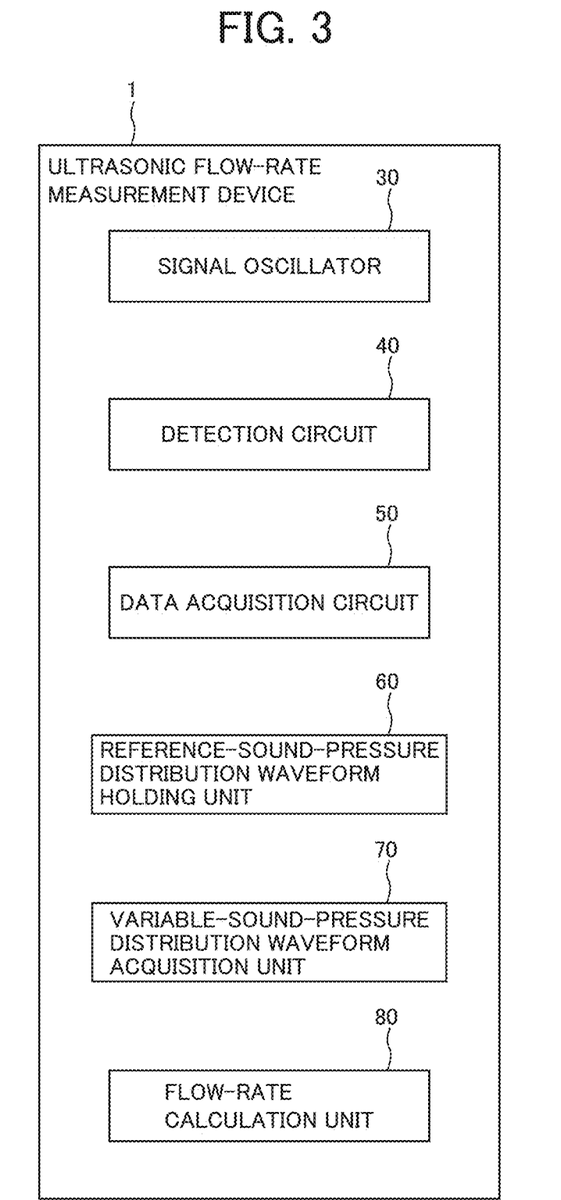
FIG. 3 is a functional block diagram showing an internal configuration of the ultrasonic flow-rate measurement device.

As shown in FIG. 3, the ultrasonic flow-rate measurement device 1 includes a signal oscillator 30, a detection circuit 40, a data acquisition circuit 50, a reference-sound-pressure distribution waveform (voltage waveform, received waveform, voltage form, voltage shape) holding unit 60, a variable-sound-pressure distribution waveform (voltage waveform, received waveform, voltage form, voltage shape) acquisition unit 70, and a flow-rate calculation unit 80.

The signal oscillator 30 outputs an oscillation signal to be supplied to the transmission-side transducer 10. A fundamental frequency of the oscillation signal in the signal oscillator 30 is determined in consideration of a material of the pipe 5, characteristics of the fluid G to be measured, a divergence of the ultrasonic pulse, and the like. A signal waveform (voltage waveform, received waveform, voltage form, voltage shape) of the oscillation signal can be an acute triangular pulse signal, and a repetition period of the pulse signal can be determined from a velocity of sound in a gas, a pipe diameter, an average flow velocity, and the like. A timing signal for outputting the oscillation signal (pulse signal) is sent to the reception-side transducer 20 as a synchronization signal.

The detection circuit 40 is connected to each of output ends of the first reception-side transducer 21 to the fifth reception-side transducer 25. Although not shown, the detection circuit 40 includes a signal amplifier configured to amplify a detection signal having a magnitude according to the intensity of the incident ultrasonic wave output from the first reception-side transducer 21 to the fifth reception-side transducer 25 and a peak detection circuit configured to read a peak value of the output of the signal amplifier. The detection circuit 40 simultaneously detects the outputs of the first reception-side transducer 21 to the fifth reception-side transducer 25 in order to obtain a flow rate at a high sampling rate. The detection circuit 40 sets a pulse reception timing according to the timing signal supplied from the signal oscillator 30.

The data acquisition circuit 50 is configured by, for example, a digital-type multiplexer that corrects all of the outputs (peak values) of the first reception-side transducer 21 to the fifth reception-side transducer 25 read by the detection circuit 40.

The reference-sound-pressure distribution waveform holding unit 60 holds a reference sound pressure distribution waveform (voltage waveform, received waveform, voltage form, voltage shape) based on the ultrasonic pulse emitted from the transmission-side transducer 10 and incident on the first reception-side transducer 21 to the fifth reception-side transducer 25 in a state where the flow velocity of the fluid G to be measured in the pipe 5 is zero. A reference sound pressure distribution waveform, which is set as a default at the time of manufacturing the ultrasonic flow-rate measurement device 1, may be held by the reference-sound-pressure distribution waveform holding unit 60 in advance, or a reference sound pressure distribution waveform, which is measured at the time of maintenance of the ultrasonic flow-rate measurement device 1, may be held by the reference-sound-pressure distribution waveform holding unit 60. Alternatively, the reference sound pressure distribution waveform held by the reference-sound-pressure distribution waveform holding unit 60 may be updated by measurement of the reference sound pressure distribution waveform each time the pipe 5 or the fluid G to be measured changes.

When the reference sound pressure distribution waveform held by the reference-sound-pressure distribution waveform holding unit 60 is measured (updated), for each of all combinations for selecting three reception-side transducers from the first reception-side transducer 21 to the fifth reception-side transducer 25, reference sound pressure distribution waveforms are acquired based on ultrasonic pulses emitted from the transmission-side transducer 10 and incident on the three reception-side transducers in a state where the flow velocity of the fluid G to be measured in the pipe 5 is zero, and the reference sound pressure distribution waveforms for all the combinations may be averaged. The combinations of the three reception-side transducers are achieved by ten methods as follows:

(1) Combination of the first reception-side transducer 21, the second reception-side transducer 22, and the third reception-side transducer 23;

(2) Combination of the first reception-side transducer 21, the second reception-side transducer 22, and the fourth reception-side transducer 24;

(3) Combination of the first reception-side transducer 21, the second reception-side transducer 22, and the fifth reception-side transducer 25;

(4) Combination of the first reception-side transducer 21, the third reception-side transducer 23, and the fourth reception-side transducer 24;

(5) Combination of the first reception-side transducer 21, the third reception-side transducer 23, and the fifth reception-side transducer 25;

(6) Combination of the first reception-side transducer 21, the fourth reception-side transducer 24, and the fifth reception-side transducer 25;

(7) Combination of the second reception-side transducer 22, the third reception-side transducer 23, and the fourth reception-side transducer 24;

(8) Combination of the second reception-side transducer 22, the third reception-side transducer 23, and the fifth reception-side transducer 25;

(9) Combination of the second reception-side transducer 22, the fourth reception-side transducer 24, and the fifth reception-side transducer 25; and (10) Combination of the third reception-side transducer 23, the fourth reception-side transducer 24, and the fifth reception-side transducer 25.

Depending on the combination of the selection of the three reception-side transducers, the output of some or all of the reception-side transducers may not be obtained. In such a case, the average of the reference sound pressure distribution waveforms for other combinations may be taken assuming that there is no reference sound pressure distribution waveform for the combination.

The variable-sound-pressure distribution waveform acquisition unit 70 acquires a variable sound pressure distribution waveform (voltage waveform, received waveform, voltage form, voltage shape) based on an ultrasonic pulse emitted from the transmission-side transducer 10 and incident on the first reception-side transducer 21 to the fifth reception-side transducer 25 in a state where the flow velocity of the fluid G to be measured in the pipe 5 is not zero. The variable-sound-pressure distribution waveform acquisition unit 70 constantly monitors the flow of the fluid G to be measured in the pipe 5, and continuously acquires a variable sound pressure distribution waveform that changes every moment.

The variable-sound-pressure distribution waveform acquisition unit 70 may, for each of all combinations for selecting three reception-side transducers from the first reception-side transducer 21 to the fifth reception-side transducer 25, acquire the variable sound pressure distribution waveform based on the ultrasonic pulse emitted from the transmission-side transducer 10 and incident on the three reception-side transducers in a state where the flow velocity of the fluid G to be measured in the pipe 5 is not zero, and average the variable sound pressure distribution waveforms for all the combinations. The combination of three reception-side transducers is as described above.

Depending on the combination of the selection of the three reception-side transducers, the output of some or all of the reception-side transducers may not be obtained. In such cases, the average of the variable sound pressure distribution waveforms for other combinations may be taken assuming that there is no variable sound pressure distribution waveform for the combination.

Figure 4:
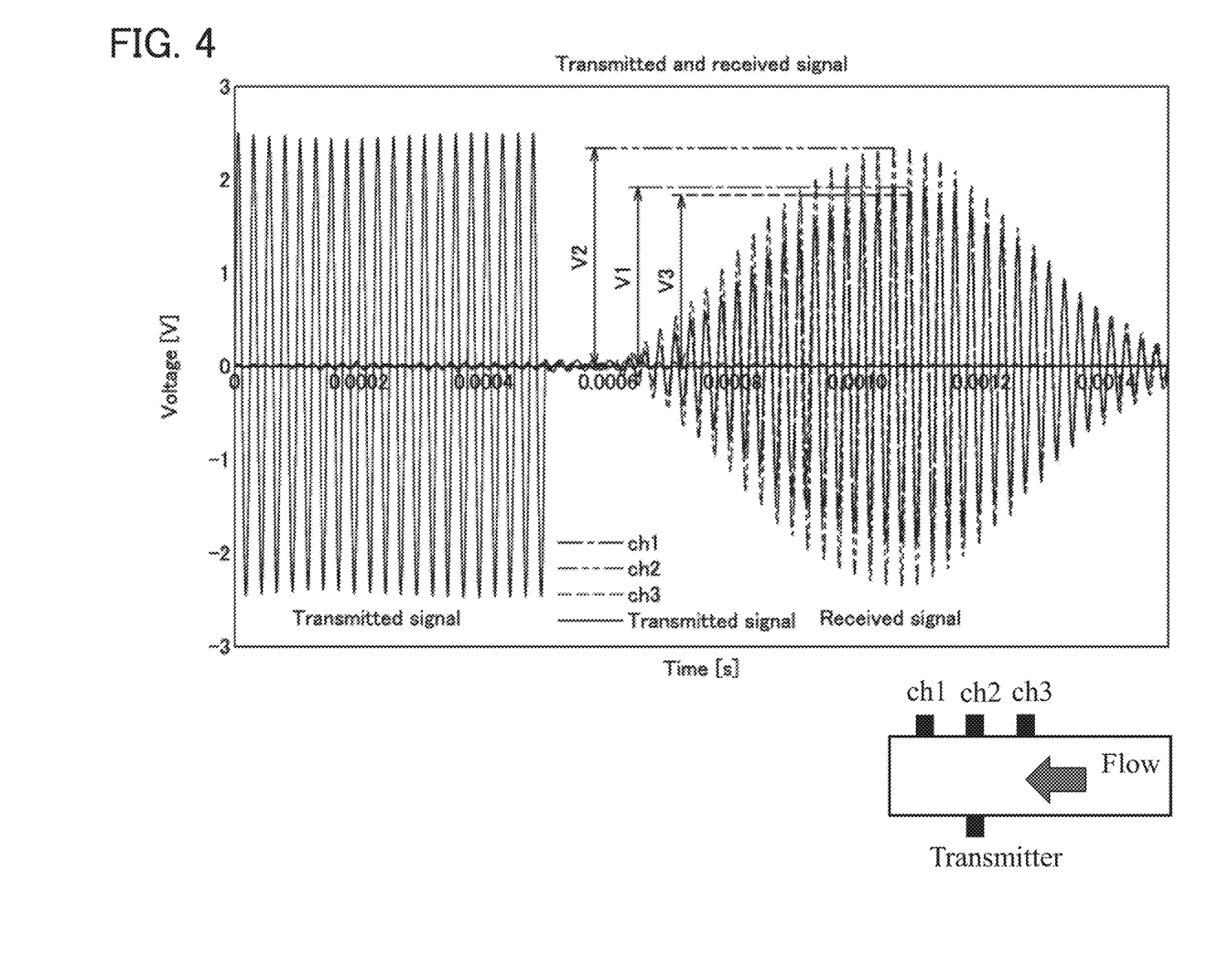
FIG. 4 is a view showing an example of a measurement method of a reference sound pressure distribution waveform and a variable sound pressure distribution waveform.

FIG. 4 shows an example of a method of measuring the reference sound pressure distribution waveform and the variable sound pressure distribution waveform. FIG. 4 shows an ultrasonic burst wave (Transmitted signal) emitted from the transmission-side transducer 10 and received waveforms (Received signals, ch1 to ch3) acquired by three reception-side transducers selected from the first reception-side transducer 21 to the fifth reception-side transducer 25. In other words, the ultrasonic burst wave indicates a voltage waveform applied to the transmission-side transducer 10, and the three received waveforms indicate voltage waveforms, which arrive at the opposite side of the transmission-side transducer 10 with a time delay, due to the three reception-side transducers. In FIG. 4, reference numerals V1 to V3 indicate amplitudes of the three received waveforms (ch1 to ch3) (in this example, satisfying a relation of V2>V1>V3).

During the measurement of the reference sound pressure distribution waveform and the variable sound pressure distribution waveform, the received waveform as shown in FIG. 4 is repeatedly acquired at a frequency of about several tens of Hz to 1 kHz, for example. The voltage waveform of the received wave is observed with a certain time delay from the transmission of the ultrasonic burst wave. The time difference simply corresponds to an inner diameter of the pipe/velocity of sound, but since a distance is slightly extended for an obliquely traveling wave, the time difference is added by the extended distance. In signal processing, for example, an instantaneous shift amount is determined by a mode of determining three sound pressures at the time difference or at a time obtained by adding a rise time of a reception sensor waveform (first-order delay of the sensor) to the time difference due to envelope detection by Hilbert transform or a mode of using the maximum value of the envelope. The reference sound pressure distribution waveform and the variable sound pressure distribution waveform are measured by repeating the above operation and taking a time average of the shift amount (smoothing).

Figure 5:
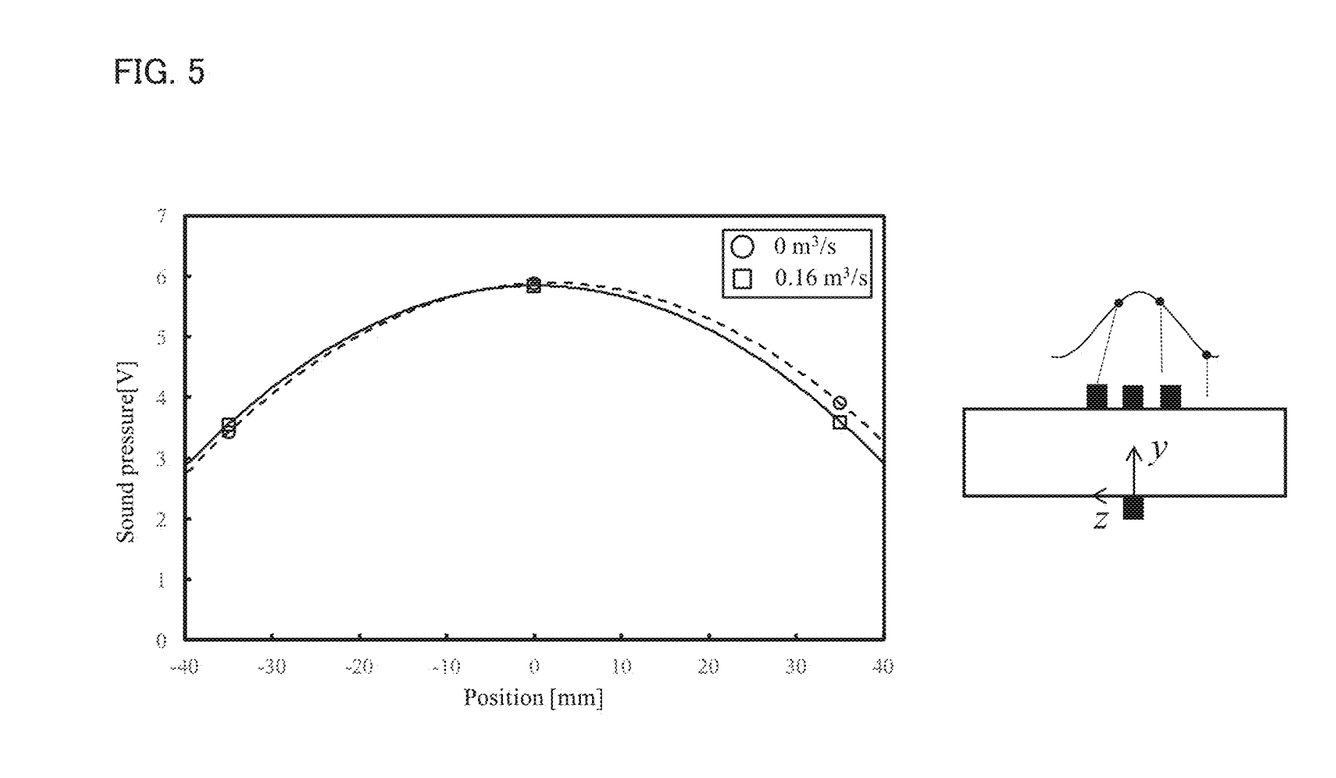
FIG. 5 is a view showing a method of estimating a sound pressure distribution by approximating (fitting) three sound pressure measurement values to a quadratic function.

In addition, the reference sound pressure distribution waveform held by the reference-sound-pressure distribution waveform holding unit 60 and the variable sound pressure distribution waveform acquired by the variable-sound-pressure distribution waveform acquisition unit 70 can be measured as follows, for example. In other words, although being represented by a Gaussian distribution, the sound pressure distribution can be approximated with a quadratic function in the vicinity of the peak, and a sound pressure distribution waveform including a center position of the peak can be estimated from at least three sound pressure measurement values. FIG. 5 shows a method of estimating a sound pressure distribution waveform by approximating (fitting) three sound pressure measurement values to a quadratic function.

The Gaussian distribution is expressed as follows by polynomial expansion near the center value.

$$e^{-x^2} = 1 - \frac{1}{1!}x^2 + \frac{1}{2!}x^4 + \ldots + (-1)^n \frac{1}{n!}x^{2n} + \ldots$$

Therefore, the Gaussian distribution can be approximated with a parabola (quadratic function) near the center value. Since the quadratic function has three unknown coefficients $(a_1+a_2x+a_3x^2)$, the sound pressure distribution waveform can be estimated by approximating (fitting) three sound pressure measurement values to the quadratic function.

On the other hand, when a flow velocity distribution is asymmetric and has a flight position which is spread at an angle in the flow direction, the flow velocity distribution deviates from a symmetric shape such as a pure parabola. Accordingly, in the present embodiment, a higher-order polynomial function is employed in order to correct a part deviating from the symmetric shape.

When there are much more sound pressure measurement values, a higher-order approximate solution can be used, so that improvement in detection accuracy can be expected. For example, as in the present embodiment, when (2n+1) reception-side transducers, that is, five (n is 2) reception-side transducers are used, the fitting can be performed by a fourth-order polynomial expression in consideration of the asymmetry of the sound pressure distribution waveform, and the sound pressure distribution waveform including the center position of the peak can be estimated with higher accuracy. The fourth-order polynomial expression is represented, for example, as follows.

$$p(x)=a_1+a_2x+a_3x^2+a_4x^3+a_5x^4$$

$$a_i(i=1, 2, 3, 4, 5)$$

Furthermore, as in the present embodiment, a sound pressure distribution waveform is acquired, for each of all combinations ($_{2+1}C_3$) for selecting three reception-side transducers from (2n+1) (n is a natural number of 2 or more) reception-side transducers, based on the ultrasonic pulse emitted from the transmission-side transducer 10 and incident on the three reception-side transducers in a state where the flow velocity of the fluid G to be measured in the pipe 5 is not zero, the sound pressure distribution waveforms for all the combinations are averaged, and thus the sound pressure distribution waveform can be improved in detection accuracy. In particular, when the variation of the moving amount of the ultrasonic pulse in the pipe 5 is large, since the sound pressure distribution waveform can be detected in a wider range, a dynamic range can be improved.

Figure 6:
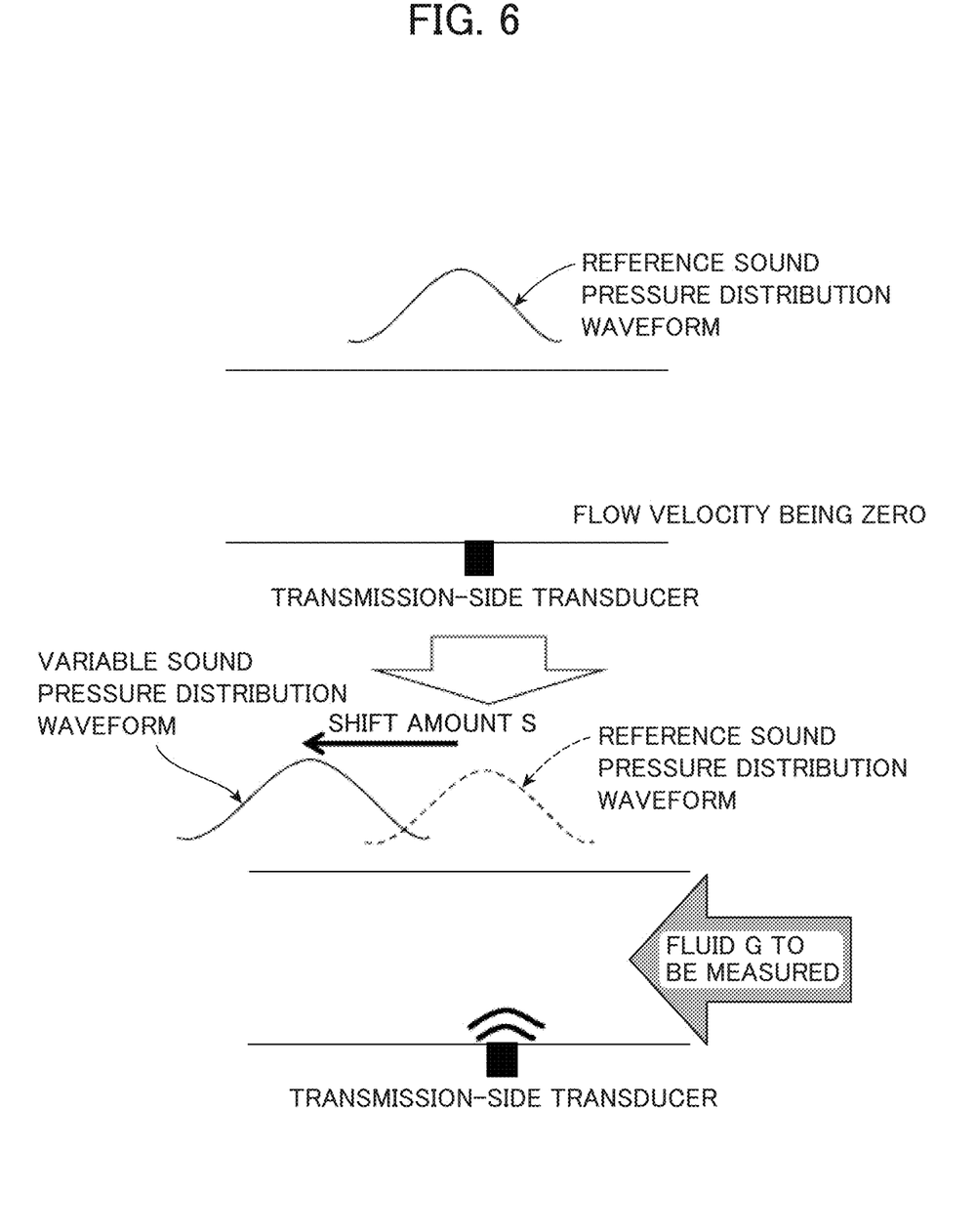
FIG. 6 is a view showing a manner in which the flow-rate calculation unit integrates a shift amount which is a difference between a reference sound pressure distribution waveform and a variable sound pressure distribution waveform to calculate a flow rate of a fluid to be measured in the pipe.

As shown in FIG. 6, the flow-rate calculation unit 80 obtains a shift amount S, which is a difference between the center position of the reference sound pressure distribution waveform held by the reference-sound-pressure distribution waveform holding unit 60 and the peak position of the variable sound pressure distribution waveform acquired by the variable-sound-pressure distribution waveform acquisition unit 70, and integrates the shift amount S, thereby calculating a flow rate of the fluid G to be measured in the pipe 5.

Assuming that the flow rate of the fluid G to be measured in the pipe 5 is Q, the shift amount which is the difference between the reference sound pressure distribution waveform and the variable sound pressure distribution waveform is S, the flow velocity distribution of the fluid G to be measured in the pipe 5 is U, and the velocity of sound is c, the following equations are established. This assumes that the fluid G to be measured in the pipe 5 has a non-axisymmetric flow. In the following equations, a coordinate system of the pipe 5 in a plane orthogonal to the axis of the pipe is indicated as x and y (the center of the pipe 5 is the origin), and a coordinate system of the pipe 5 in the axial direction of the pipe is indicated as z.

First, the flow rate Q is represented by a surface integral of the flow velocity distribution U.

$$Q=\iint U(x,y)dxdy$$

Next, the shift amount S is represented by a linear integral of the measured linear flow velocity, and the distribution of the shift amount S is integrated as follows.

$$\int S(y)dy = \int\int \frac{U(x, y)}{c} dxdy$$

Then, the flow rate Q is obtained by a linear integral of the distribution of the shift amount S.

$$Q=c\int S(y)dy$$

On the other hand, when the fluid G to be measured in the pipe 5 has an axisymmetric flow, the following equations are established assuming that the average flow velocity of the fluid G to be measured in the pipe 5 is v and the inner diameter of the pipe 5 is D in addition to the assumption described above.

First, the shift amount S is obtained by an integral of the flow velocity distribution U in the pipe 5.

$$S = \int_{-\frac{D}{2}}^{\frac{D}{2}} \frac{U(y)}{c} dy$$

Next, the average flow velocity v is represented by the following equation.

$$v=s\cdot(c/D)$$

Then, the flow rate Q is represented by the following equation:

$$Q=v\cdot(\pi D^2/4).$$

Figure 7A:
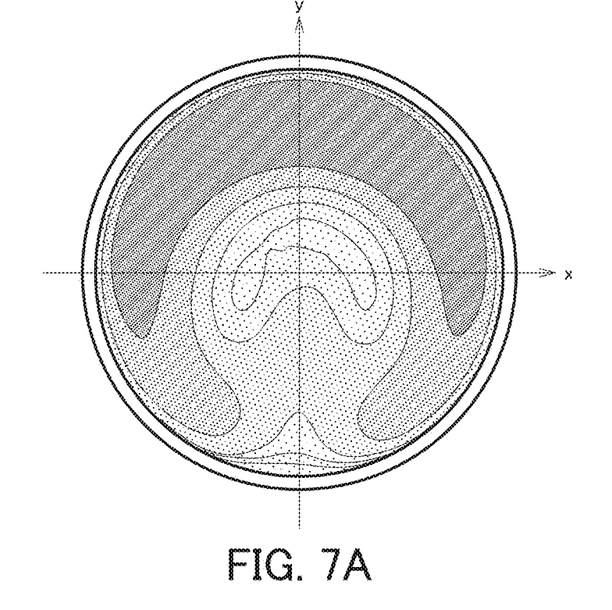
FIG. 7 shows a distribution of a shift amount on an xy plane in a cross section orthogonal to an axis of the pipe.
Figure 7B:
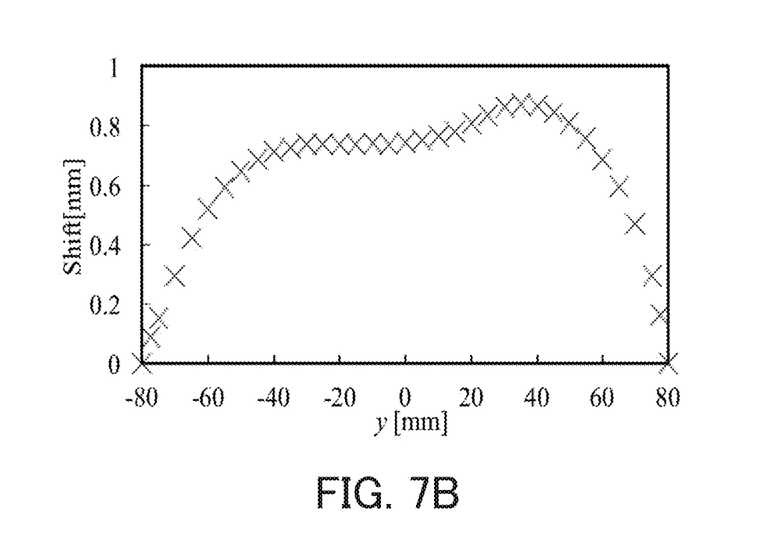

FIG. 7 shows a distribution of the shift amount S on the xy plane in a cross section orthogonal to the axis of the pipe 5. As shown in FIG. 7, since the shift amount S varies on the xy plane in a cross section orthogonal to the axis of the pipe 5, the above-described averaging method is considered to be useful, for example.

Figure 8:
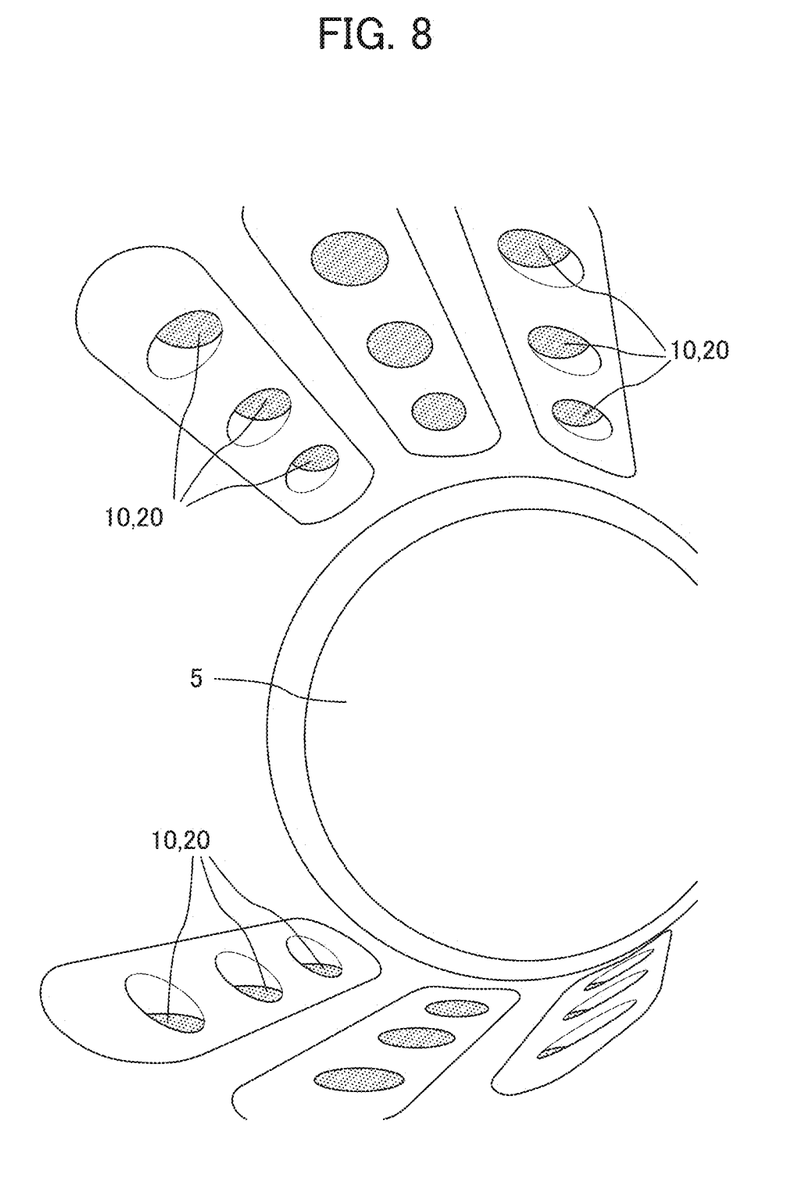
FIG. 8 shows a configuration in which a transmission-side transducer and a reception-side transducer are disposed to be laid all over an inner surface of the pipe.
Figure 9:
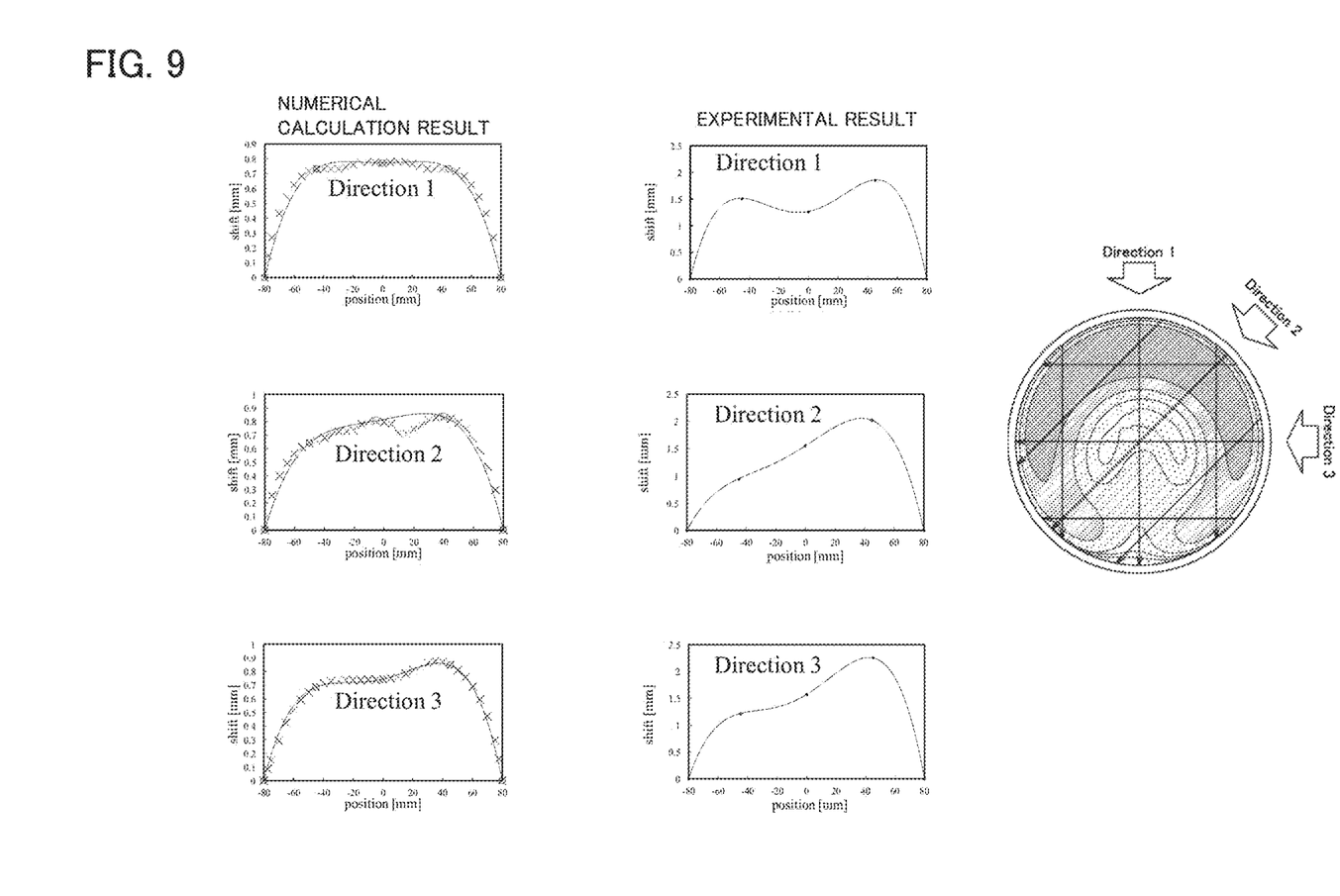
FIG. 9 shows examples of shift amounts obtained by three sets of a transmission-side transducer and a reception-side transducer provided to have different circumferential positions at the same position in the axial direction of the pipe.

FIG. 8 shows a configuration in which the transmission-side transducer 10 and the reception-side transducer 20 are disposed to be laid all over the inner surface of the pipe 5. In other words, shift amounts S and thus flow rates obtained by a plurality of sets of the transmission-side transducer and the reception-side transducer provided to have different circumferential positions at the same position in the axial direction of the pipe may be averaged. FIG. 9 shows examples (numerical calculation results and experimental results) of shift amounts S obtained by three sets of the transmission-side transducer and the reception-side transducer provided to have different circumferential positions at the same position in the axial direction of the pipe.

As described above, according to the present embodiment, the reference-sound-pressure distribution waveform holding unit 60 holds the reference sound pressure distribution waveform based on the ultrasonic pulse emitted from the transmission-side transducer 10 and incident on the first reception-side transducer 21 to the fifth reception-side transducer 25 in a state where the flow velocity of the fluid G to be measured in the pipe 5 is zero, the variable-sound-pressure distribution waveform acquisition unit 70 acquires the variable sound pressure distribution waveform based on the ultrasonic pulse emitted from the transmission-side transducer 10 and incident on the first reception-side transducer 21 to the fifth reception-side transducer 25 in a state where the flow velocity of the fluid G to be measured in the pipe 5 is not zero, and the flow-rate calculation unit 80 obtains the shift amount S, which is the difference between the reference sound pressure distribution waveform and the variable sound pressure distribution waveform, and integrates the shift amount S, thereby calculating the flow rate of the fluid G to be measured in the pipe 5. This makes it possible to accurately measure the flow rate of the fluid G to be measured with a simple configuration.

In the embodiment described above, the case where the transmission-side transducer 10 and the reception-side transducer 20 are installed on the inner surface of the pipe 5 is described as an example, but a so-called clamp-on system in which the transmission-side transducer 10 and the reception-side transducer 20 are installed on an outer surface of the pipe 5 is also applicable. However, the moving amount of the ultrasonic pulse in the pipe 5 depends on the size (diameter) of the pipe 5, but usually very small (for example, 0.1 mm to several mm), and thus at least the reception-side transducer 20 is better to be installed on the inner surface of the pipe 5. This is because, when the reception-side transducer 20 is installed on the outer surface of the pipe 5 by the clamp-on system, the amount of refraction of the beam due to the presence of the wall surface of the pipe 5 becomes substantially equal to the moving amount of the ultrasonic pulse and the detection accuracy of the reception-side transducer 20 is reduced. Further, this is because, due to the reason that the interval between the transducers adjacent to each other in the first reception-side transducer 21 to the fifth reception-side transducer 25 is very small, the ultrasonic pulse that should be detected by a certain reception-side transducer is erroneously detected by another reception-side transducer adjacent thereto, for example. From the above, when the pipe 5 has a large diameter and a thin wall surface, the reception-side transducer 20 can be installed on the outer surface of the pipe 5 by the clamp-on system, but otherwise, the reception-side transducer 20 is preferably installed on the inner surface of the pipe 5.

INDUSTRIAL APPLICABILITY

The ultrasonic flowmeter 1 of the present embodiment can be mounted on, for example, a muffler of a vehicle and used to measure the flow rate of an exhaust gas in the muffler.

REFERENCE SIGNS LIST

1 ultrasonic flowmeter
5 pipe
10 transmission-side transducer (transmitter)
20 reception-side transducer (receiver)
21 first reception-side transducer
22 second reception-side transducer
23 third reception-side transducer
24 fourth reception-side transducer
25 fifth reception-side transducer
30 signal oscillator
40 detection circuit
50 data acquisition circuit
60 reference-sound-pressure distribution waveform holding unit
70 variable-sound-pressure distribution waveform acquisition unit
80 flow-rate calculation unit
G fluid to be measured
S shift amount

The invention claimed is:

1. An ultrasonic flow-rate measurement device comprising:
   a transmitter that is installed in a pipe through which a fluid to be measured flows and emits an ultrasonic pulse;
   a plurality of receivers, a total number of which is (2n+1), with n being a natural number of 2 or more, that are installed in the pipe to face the transmitter and on which the ultrasonic pulse is incident;
   a reference-sound-pressure distribution waveform holding unit that holds a reference sound pressure distribution waveform based on the ultrasonic pulse emitted from the transmitter and incident on the (2n+1) receivers in a state where a flow velocity of the fluid to be measured in the pipe is zero;
   a variable-sound-pressure distribution waveform acquisition unit that acquires a variable sound pressure distribution waveform based on the ultrasonic pulse emitted from the transmitter and incident on the (2n+1) receivers in a state where the flow velocity of the fluid to be measured in the pipe is not zero; and
   a flow-rate calculation unit that obtains a shift amount, which is a difference between the reference sound pressure distribution waveform and the variable sound pressure distribution waveform, and integrates the shift amount, thereby calculating a flow rate of the fluid to be measured in the pipe, wherein
   the variable-sound-pressure distribution waveform acquisition unit, for each of all combinations for selecting three receivers from the (2n+1) receivers, acquires the variable sound pressure distribution waveform based on the ultrasonic pulse emitted from the transmitter and incident on the three receivers in a state where the flow velocity of the fluid to be measured in the pipe is not zero, and averages the variable sound pressure distribution waveforms for all of the combinations.

2. The ultrasonic flow-rate measurement device according to claim 1, wherein
   the transmitter and the receivers are installed on an inner surface of the pipe.

3. An ultrasonic flow-rate measurement method with an ultrasonic flow-rate measurement device, the ultrasonic flow-rate measurement device including:
   a transmitter that is installed in a pipe through which a fluid to be measured flows and emits an ultrasonic pulse; and
   a plurality of receivers, a total number of which is (2n+1), with n being a natural number of 2 or more, that are installed in the pipe to face the transmitter and on which the ultrasonic pulse is incident,
the ultrasonic flow-rate measurement method comprising:
   a reference-sound-pressure distribution waveform holding step of holding a reference sound pressure distribution waveform based on the ultrasonic pulse emitted from the transmitter and incident on the (2n+1) receivers in a state where a flow velocity of the fluid to be measured in the pipe is zero;
   a variable-sound-pressure distribution waveform acquisition step of acquiring a variable sound pressure distribution waveform based on the ultrasonic pulse emitted from the transmitter and incident on the (2n+1) receivers in a state where the flow velocity of the fluid to be measured in the pipe is not zero; and
   a flow-rate calculation step of obtaining a shift amount, which is a difference between the reference sound pressure distribution waveform and the variable sound pressure distribution waveform, and integrating the shift amount, thereby calculating a flow rate of the fluid to be measured in the pipe, wherein
   the variable-sound-pressure distribution waveform acquisition step includes, for each of all combinations for selecting three receivers from the (2n+1) receivers, acquiring the variable sound pressure distribution waveform based on the ultrasonic pulse emitted from the transmitter and incident on the three receivers in a state where the flow velocity of the fluid to be measured in the pipe is not zero, and averaging the variable sound pressure distribution waveforms for all of the combinations.

* * * * *